United States Patent
Zhang et al.

(10) Patent No.: US 12,322,051 B2
(45) Date of Patent: Jun. 3, 2025

(54) RANKING LIST INFORMATION DISPLAY METHOD AND APPARATUS, AND ELECTRONIC DEVICE AND STORAGE MEDIUM

(71) Applicant: Lemon Inc., Grand Cayman (KY)

(72) Inventors: Jingcong Zhang, Los Angeles, CA (US); Weikai Li, Los Angeles, CA (US); Zihao Chen, Los Angeles, CA (US); Guohui Wang, Los Angeles, CA (US); Xiao Yang, Los Angeles, CA (US); Haiying Cheng, Culver City, CA (US); Anda Li, Los Angeles, CA (US); Ray McClure, Los Angeles, CA (US); Zhili Chen, Los Angeles, CA (US); Yiheng Zhu, Los Angeles, CA (US); Shihkuang Chu, Los Angeles, CA (US); Liyou Xu, Beijing (CN); Yunzhu Li, Los Angeles, CA (US); Jianchao Yang, Los Angeles, CA (US)

(73) Assignee: LEMON INC., Grand Cayman (KY)

( * ) Notice: Subject to any disclaimer, the term of this patent is extended or adjusted under 35 U.S.C. 154(b) by 133 days.

(21) Appl. No.: 18/020,852

(22) PCT Filed: Aug. 26, 2021

(86) PCT No.: PCT/SG2021/050507
§ 371 (c)(1),
(2) Date: Feb. 10, 2023

(87) PCT Pub. No.: WO2022/055420
PCT Pub. Date: Mar. 17, 2022

(65) Prior Publication Data
US 2023/0306694 A1 Sep. 28, 2023

(30) Foreign Application Priority Data
Sep. 10, 2020 (CN) .......................... 202010948337.0

(51) Int. Cl.
*G06T 19/00* (2011.01)

(52) U.S. Cl.
CPC .................................. *G06T 19/006* (2013.01)

(58) Field of Classification Search
CPC .................................................... G06T 19/006
See application file for complete search history.

(56) References Cited

U.S. PATENT DOCUMENTS

| | | | |
|---|---|---|---|
| 10,650,422 B1 | 5/2020 | Benkreira et al. | |
| 2007/0168875 A1* | 7/2007 | Kowitz | G06F 3/0481 |
| | | | 715/764 |

(Continued)

FOREIGN PATENT DOCUMENTS

| CN | 101329707 A | 12/2008 |
|---|---|---|
| CN | 105654471 A | 6/2016 |

(Continued)

OTHER PUBLICATIONS

International Search Report in PCT/SG2021/050507, mailed Nov. 30, 2021, 3 pages.

(Continued)

*Primary Examiner* — Terrell M Robinson
(74) *Attorney, Agent, or Firm* — Astute IP Law Group

(57) ABSTRACT

A list information display method and apparatus, an electronic device, and a storage medium are provided, the method includes: displaying list information in response to an information display operation triggered by a user; obtaining a real scene shooting image; and loading a plurality of types of information related to the list information into the real scene shooting image and display the real scene shooting image. Due to the use of virtual enhanced display technology, while the list information is displayed in the real scene shooting image, the plurality of types of information related to the list information are also displayed. On one (Continued)

hand, the user can obtain more information related to the list information while obtaining the list information, which improves the efficiency of information acquisition; and on the other hand, the user can obtain information in the real scene shooting image, which improves the visual effect and interactive experience.

19 Claims, 5 Drawing Sheets

(56) References Cited

U.S. PATENT DOCUMENTS

| | | |
|---|---|---|
| 2013/0073387 A1 | 3/2013 | Heath |
| 2014/0282220 A1 | 9/2014 | Wantland et al. |
| 2015/0007114 A1* | 1/2015 | Poulos ............... G06F 3/0482 715/852 |
| 2016/0077810 A1 | 3/2016 | Bertilsson et al. |
| 2016/0217612 A1 | 7/2016 | Petill et al. |
| 2019/0107990 A1* | 4/2019 | Spivack ............... G06T 11/60 |
| 2020/0058169 A1 | 2/2020 | Friesenhahn et al. |
| 2023/0229381 A1* | 7/2023 | Mak ............... G06V 10/235 345/633 |
| 2024/0211113 A1* | 6/2024 | Zurmoehle ............ G06F 3/011 |

FOREIGN PATENT DOCUMENTS

| | | |
|---|---|---|
| CN | 106910251 A | 6/2017 |
| CN | 304322076 S | 10/2017 |
| CN | 109144244 A | 1/2019 |
| CN | 109496423 A | 3/2019 |
| CN | 109600656 A | 4/2019 |
| WO | 2017215899 A2 | 12/2017 |
| WO | 2019223391 A1 | 11/2019 |

OTHER PUBLICATIONS

Written Opinion in PCT/SG2021/050507, mailed Nov. 30, 2021, 5 pages.

* cited by examiner

RANKING LIST INFORMATION DISPLAY METHOD AND APPARATUS, AND ELECTRONIC DEVICE AND STORAGE MEDIUM

CROSS-REFERENCE TO RELATED APPLICATION

This application is a 35 U.S.C. § 371 national phase of International Patent Application No. PCT/SG2021/050507, filed on Aug. 26, 2021, which claims priority of Chinese Patent Application No. 202010948337.0, filed on Sep. 10, 2020. The entire disclosure of the aforementioned applications are incorporated herein by reference as part of the present application for all purposes.

TECHNICAL FIELD

Embodiments of the present disclosure relate to a list information display method and apparatus, an electronic device, and a storage medium.

BACKGROUND

Augmented Reality (AR) technology is a display technology that integrates real world information and virtual world information on a screen. With the increase of people's online social networking, it is possible to combine the display technology of Augmented Reality with the online social networking.

The list refers to a list ranked based on the hotness or popularity of star idols, multimedia works, and hot topics. How to provide users with more diverse augmented reality display modes to improve users' online social experience when obtaining the list has become a research hotspot.

SUMMARY

In view of the above problems, the embodiments of the present disclosure provide a list information display method and apparatus, an electronic device, and a storage medium.

In a first aspect, an embodiment of the present disclosure provides a list information display method, comprising: displaying list information in response to an information display operation triggered by a user; obtaining a real scene shooting image; and loading a plurality of types of information related to the list information into the real scene shooting image and displaying the real scene shooting image.

In a second aspect, an embodiment of the present disclosure provides a list information display apparatus, comprising: a display module, configured to display list information in response to an information display operation triggered by a user; a shooting module, configured to obtain a real scene shooting image; and a processing module, configured to load a plurality of types of information related to the list information into the real scene shooting image for display by the display module.

In a third aspect, an embodiment of the present disclosure provides an electronic device, comprising: at least one processor; and a memory. The memory stores computer-executable instructions; and the at least one processor executes the computer-executable instructions stored in the memory to cause the at least one processor to execute the list information display method described in the first aspect above and various possible designs of the first aspect.

In a fourth aspect, an embodiment of the present disclosure provides a computer-readable storage medium, computer-executable instructions are stored in the computer-readable storage medium, and when a processor executes the computer-executable instructions, the list information display method described in the first aspect above and various possible designs of the first aspect is implemented.

In the list information display method and apparatus, the electronic device, and the storage medium provided by the embodiments of the present disclosure, the list information is displayed in response to an information display operation triggered by a user, a real scene shooting image is obtained, and a plurality of types of information related to the list information are loaded into the real scene shooting image and the real scene shooting image is displayed. Due to the use of virtual enhanced display technology, while the list information is displayed in the real scene shooting image, the plurality of types of information related to the list information are also displayed. On one hand, the user can obtain more information related to the list information while obtaining the list information, which improves the efficiency of information acquisition; and on the other hand, the user can obtain information in the real scene shooting image, which improves the visual effect and interactive experience.

BRIEF DESCRIPTION OF THE DRAWINGS

In order to more clearly illustrate the technical solutions in the embodiments of the present disclosure or the technical solutions in the known technology, the following briefly introduces the accompanying drawings that need to be used in the descriptions of the embodiments or the known technology, it is apparent that the accompanying drawings in the following description are some embodiments of the present disclosure, for those skilled in the art, other drawings can also be obtained according to these drawings on the premise of no creative work.

DETAILED DESCRIPTION

In order to make objects, technical solutions, and advantages of the embodiments of the present disclosure more apparent, the technical solutions of the embodiments of the present disclosure will be clearly and completely described below with reference to the accompanying drawings in the embodiments of the present disclosure. Apparently, the described embodiments are just a part but not all of the embodiments of the present disclosure. Based on the embodiments in the present disclosure, those skilled in the art can obtain other embodiment(s), without any inventive work, which should be within the protection scope of the present disclosure.

The list may refer to a list ranked based on the hotness or popularity of star idols, multimedia works, and hot topics. Boost ranking operation refers to an operation of voting or canvassing for their favorite list objects, such as star idols, multimedia works, hot topics, and the like, to increase the hotness or popularity of the list object.

In a known display scenario for the list, the display of the list is generally implemented based on static display technology, that is, a server lists a corresponding list after counting the list ranking of the list objects, and displays list information to the user in the form of a list.

However, it is obvious that the above-mentioned display method allows the user to only browse the list provided by the server, and because the display space of the list is limited when the list is statically displayed, the content of the list information contained in the lists is less, and the information is also relatively simple, which cannot provide the user with a better browsing and interactive experience when obtaining the list information.

In the list information display method and apparatus, the electronic device, and the storage medium provided by the embodiments of the present disclosure, the list information is displayed in response to an information display operation triggered by a user, a real scene shooting image is obtained, and a plurality of types of information related to the list information are loaded into the real scene shooting image and the real scene shooting image is displayed. Due to the use of virtual enhanced display technology, while the list information is displayed in the real scene shooting image, the plurality of types of information related to the list information are also displayed. On one hand, the user can obtain more information related to the list information while obtaining the list information, which improves the efficiency of information acquisition; and on the other hand, the user can obtain information in the real scene shooting image, which improves the visual effect and interactive experience.

Figure 1:
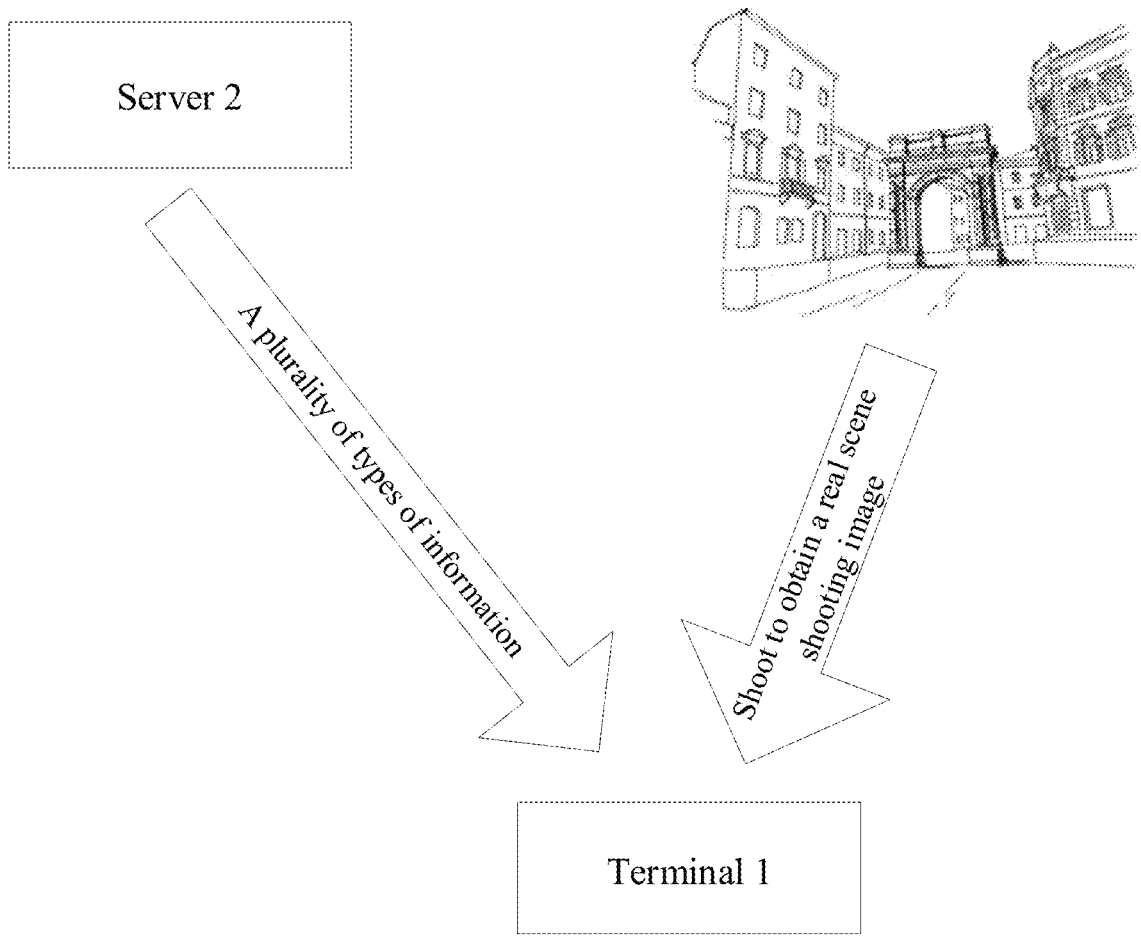
FIG. 1 is a schematic diagram of a network architecture on which the present disclosure is based.

Referring to FIG. 1, FIG. 1 is a schematic diagram of an information display system architecture on which the present disclosure is based, and the system architecture illustrated in FIG. 1 specifically includes a terminal 1 and a server 2.

The terminal 1 may specifically be a hardware device, such as a user's mobile phone, a smart home device, a tablet computer, etc., which can be used to shoot a real scene and display the shot real scene, and the server 2 may be a server cluster storing a plurality of types of information and provided in the cloud.

The list information display method provided by the present disclosure may be specifically executed on the terminal 1 that interacts with the server 2 by using its own network components to obtain a plurality of types of information pre-stored in the server 2. After executing the method, the terminal 1 displays the execution result on its own screen or display component for the user to obtain.

In particular, the architecture illustrated in FIG. 1 may be applied to a plurality of application scenarios, including the display scenario of the list information, and the list information may specifically be a list of star popularity ranking in the entertainment field, a hot search ranking list of current affairs topics in the social media field, a list of reputation ranking of literary works in the cultural field, or even a ranking list of food recommendations in the food field, etc.

Regardless of the application scenario in any field, the list information display method provided by the present disclosure can, based on actual demand, call a plurality of types of information related to the list information from the server and display them in combination with the real scene shooting image shot by the terminal for the user to obtain.

The following will further describe the list information display method provided by the present disclosure.

Figure 2:
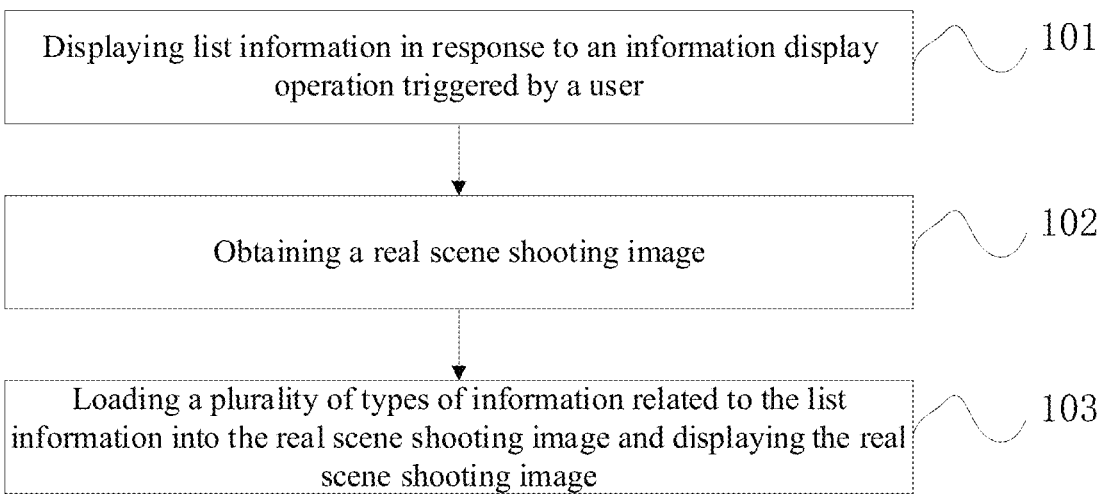
FIG. 2 is a schematic flowchart of a list information display method provided by at least one embodiment of the present disclosure.

In the first aspect, referring to FIG. 2, FIG. 2 is a schematic flowchart of a list information display method provided by at least one embodiment of the present disclosure. The list information display method provided by the embodiment of the present disclosure includes:

step 101: displaying list information in response to an information display operation triggered by a user;

step 102: obtaining a real scene shooting image; and step 103: loading a plurality of types of information related to the list information into the real scene shooting image and displaying the real scene shooting image.

It should be noted that the execution subject of the method provided in this example is the terminal in the aforementioned information display system. In some embodiments of the present disclosure, a client or display terminal is installed or integrated on the terminal, and the client or display terminal may be used by the user to trigger corresponding operations, so that the terminal can execute the list information display method provided by the present disclosure under the trigger of the user, and present the display results to the user through the application interface or display interface provided by the client or display terminal.

Specifically, the terminal in the information display system can receive the information display operation triggered by the user, and perform corresponding processing. Specifically, the information display operation may be implemented by different touch methods such as clicking, sliding, pressing, voice triggering, expression triggering, action triggering, etc., which can be used to start or activate the list information display function provided by the terminal.

After receiving the information display operation, the terminal will firstly present the list information to the user and start the shooting component, so that the shooting component can shoot the current real scene and obtain the real scene shooting image.

The shooting component may be hardware integrated on the terminal, such as a front camera or rear camera of a mobile phone; and the shooting component may also be hardware connected to the terminal through wired or wireless connection, such as an external camera or the like.

Then, the terminal will obtain a plurality of types of information related to the list information from the server based on the information display operation.

In terms of technical implementation, the terminal can call the display interfaces of the plurality of types of information to obtain the plurality of types of information from the server through these display interfaces, so as to facilitate the subsequent display of the obtained plurality of types of information in the real scene shooting image. The plurality of types of information refer to information in different information formats, including text information, video information, virtual modeling information, and the like. The display interfaces of the information may be understood as calling interfaces that can be used to obtain different types of information from the server.

In an alternative embodiment, in the embodiment of the present disclosure, when displaying the real scene shooting image loaded with the plurality of types of information, the terminal may first perform image segmentation processing on the obtained real scene shooting image to determine an information display region of the real scene shooting image; then, loads the plurality types of information into the information display region of the real scene shooting image based on the augmented reality display technology and displays the real scene shooting image loaded with the plurality of types of information.

Specifically, the image segmentation processing may adopt various methods. For example, the information display region may be determined based on a boundary line between the sky and the ground. For example, a region occupied by the sky and a region not occupied by the sky in the image may be determined, and the region occupied by the sky is used as the information display region for displaying different types of information.

In addition, in order to make different information more distinguishable when displayed, and make the display effect clearer, in an optional embodiment, the terminal may determine the display transparency of each type of information, and based on the display transparency of each type of information, display the plurality of types of information in the real scene shooting image. The display transparency is preset by the user, which is not limited in the present disclosure.

In order to further illustrate the list information display method provided by the present disclosure, the present disclosure will be further explained below by taking the display scenario of displaying the star popularity ranking list as an example.

Figure 3:
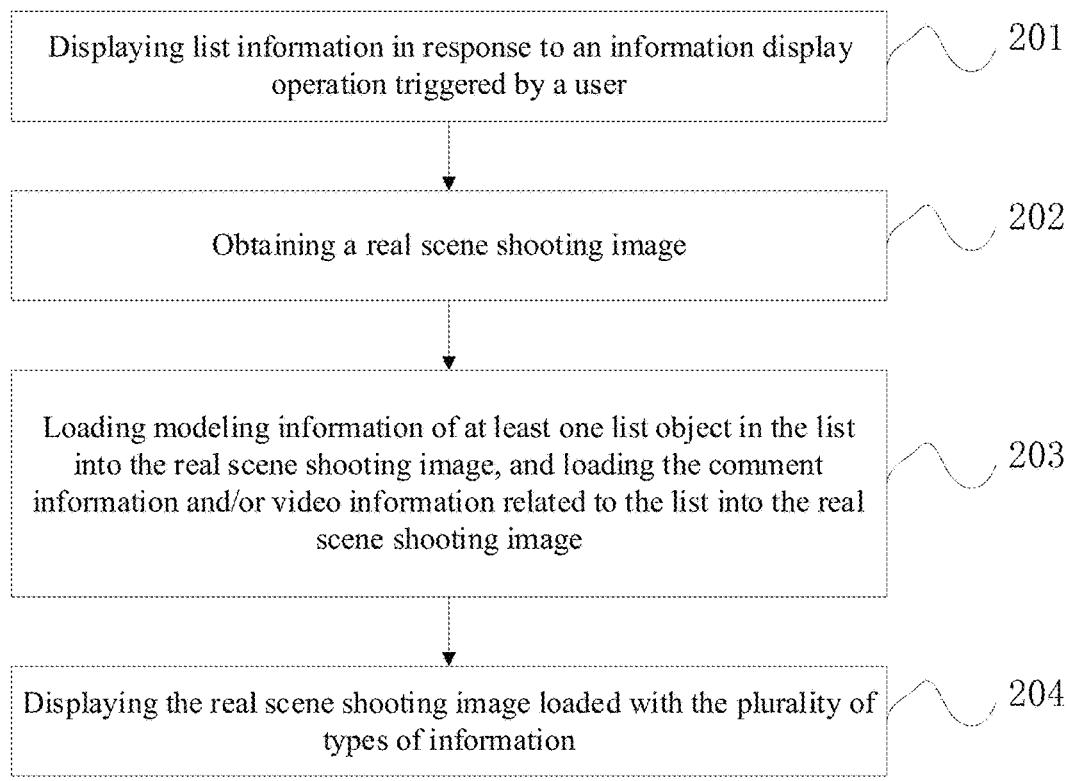
FIG. 3 is a schematic flowchart of another list information display method provided by the present disclosure.

Specifically, FIG. 3 is a schematic flowchart of another list information display method provided by the present disclosure. As illustrated in FIG. 3, the method includes:
- step 201: displaying list information in response to an information display operation triggered by a user;
- step 202: obtaining a real scene shooting image;
- step 203: loading modeling information of at least one list object in the list into the real scene shooting image, and loading the comment information and/or video information related to the list into the real scene shooting image; and
- step 204: displaying the real scene shooting image loaded with the plurality of types of information.

Combined with the list information display method provided by the present disclosure, different from the known technology, when the user triggers the information display operation to activate the display function for the list information, the information display system will load the modeling information of the list into the real scene shooting image, load the comment information and/or the video information into the real scene shooting image, and display the above-mentioned information together.

Specifically, after the user triggers the information display operation for the list information, the terminal will start the shooting component to shoot the current real scene and obtain the real scene shooting image. In this case, the terminal will further respond to the operation to display the list information on the display interface, where the list information may include basic information of the list such as names of respective list objects, the list ranking, and the like.

Optionally, after the display function of the list information is activated, the information can be displayed in a combination of the plurality of types of information. For example, the modeling information of at least one list object in the list may be displayed together with relevant comment information; or, the modeling information of at least one list object in the list may be displayed together with relevant video information; or, the modeling information of at least one list object, the relevant video information, and the relevant comment information may be displayed simultaneously.

In an alternative implementation, the user can select a desired combination of information to display the list information according to the performance or display requirements of the terminal.

Figure 4:
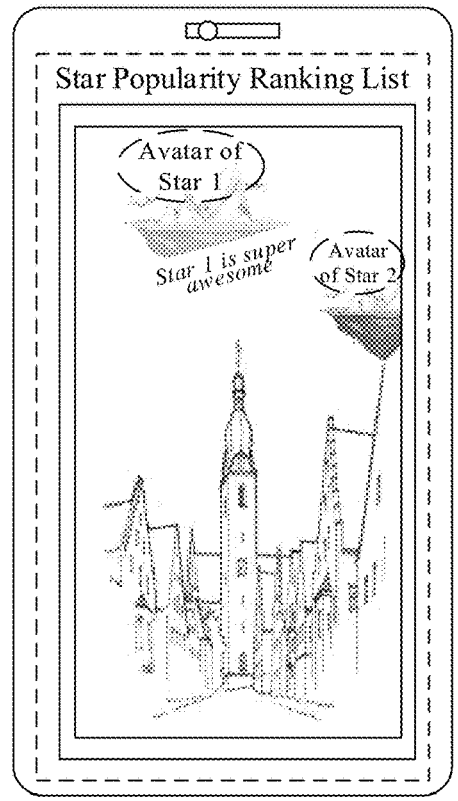
FIG. 4 is a schematic diagram of a first interface of a list information display method provided by the present disclosure.

Taking the case where the modeling information of at least one list object in the list and the comment information related to the list are displayed simultaneously in the real scene shooting image as an example, FIG. 4 is a schematic diagram of a first interface of the list information display method provided by the present disclosure, and as illustrated in FIG. 4, after the user triggers the information display operation for displaying the star popularity ranking list, the terminal will execute the information display method provided by the present disclosure. In this case, not only the real scene shooting image, but also island modeling with two stars, and the comment information related to the stars uploaded by the user or other users to the server are presented on the terminal interface.

In the present embodiment, when displaying the modeling information of the list, the interaction with the server needs to be triggered to perform certain modeling processing on a real-time list, so as to obtain the modeling information of at least one list object that can be displayed for display on the interface. That is, an information display apparatus may first call real-time list data from the server, and then generate the modeling information of at least one list object in the list according to the real-time list data.

Specifically, the real-time list data refers to the data including information of a plurality of list objects and the list ranking of each list object, the real-time list data is maintained and stored by the server. When the terminal generates the modeling information of at least one list object in the list according to the real-time list data, the terminal may first determine at least one target list object from the plurality of list objects in the real-time list data obtained from the server, and then, generate the modeling information of respective target list objects according to list rankings of the respective target list objects, and the modeling information of the respective target list objects constitute the modeling information of at least one list object in the list.

Optionally, the selection of the target list object may be based on the list ranking. For example, a list object whose list ranking is greater than a preset ranking threshold can be used as the target list object. For example, the "top three" list objects ranked in the list are used as the target list objects.

Optionally, in order to make the visual effect more outstanding, when the modeling information of the respective target list objects is generated according to the list rankings of the respective target list objects, it can be implemented based on different ranking models. Specifically, the terminal can call a preset ranking model according to the list rankings of the respective target list objects; that is, the information of the target list object and its corresponding ranking model constitute the modeling information of the target list object.

Optionally, different list rankings correspond to different ranking models. For example, as illustrated in FIG. 4, for the list display of stars, the ranking model with the "palace island" patterns of different styles may be preset. The higher the ranking of the ranking model, the higher the complexity of the pattern, the more exquisite the modeling effects, and the larger the pattern.

Correspondingly, when generating the modeling information of the target list object, for example, when generating the modeling information of a "ranked first" star, the "ranked first" ranking model may be called, and then the avatar, name and other information of the star are combined with the model to form the modeling information of the star and display the modeling information in the real scene shooting image.

In the present embodiment, the present disclosure further provides a real-time message function for the list, so that the user can leave a message when displaying the list. In order to make the display effect more outstanding, in particular, in the present disclosure, a plurality of special effect processing methods for text are adopted.

Specifically, the terminal may call real-time comment data from the server first, and then perform text special effect processing on the text content in the real-time comment data to obtain the comment information.

In one of the optional display methods, the display of the comment information may be implemented based on the comment time in the real-time comment data. Specifically, when the text special effect processing is performed on the text content in the real-time comment data to obtain the comment information, the terminal may, according to the comment time, perform different text special effect processing on the text content in the real-time comment data to obtain the comment information.

Alternatively, the text special effect processing includes processing the text content in a display dimension, and/or processing the text content in a display form.

For example, when performing the text special effect processing on the text content of the comment data, the font, display color, and display duration of the text may be processed, so that the closer the comment time is to the current time, the larger the font of the text content, the brighter the display color of the text content, and the longer the display duration of the text content.

For another example, the display of the comment information may be dynamic display, that is, different or the same motion trajectory is set for each text content, so that the comment information can be dynamically displayed in a "bullet screen" mode.

Optionally, some text contents may be dynamically displayed in a mode of "swiping" the interface, for example, "when will the new list be released on the hot list", and other text content may be displayed in a mode of "scrolling around" the modeling information of the list, such as "star 1 is super awesome".

On the one hand, the selection of the dynamic display mode may be determined based on the semantic content of the comment information. For example, whether to use the dynamic display mode of "swiping" the interface may be determined by analyzing whether the text content includes the keyword of "list object". On the other hand, the selection of the dynamic display mode may be based on the user portrait. If the user portrait is a "fan of star 1", the comments made by the user will be displayed in the mode of "scrolling around" the modeling information of the list of the star 1.

For another example, when displaying, the text may also be processed in the display dimension, and the three-dimensional text special effect processing or two-dimensional text special effect processing may be performed on the text, so that the effect of the text content of the comments after being performed with the special effect processing in the display dimension is more outstanding when displayed. In order to reduce the processing computation amount during the special effect processing, optionally, the three-dimensional text special effect processing may be performed only on the text with a relatively new comment time, and the two-dimensional text special effect processing may be performed on the text with an earlier comment time.

In the present embodiment, the present disclosure further provides a video display function for the list, so that the user can synchronously watch a video related to the list when the list is displayed.

Specifically, the terminal can call video data of the respective list objects in the list from the server; and can sequentially load the real-time video data into the real scene shooting image according to release time of respective video data, or the list rankings of the corresponding list objects.

Specifically, in the case where the list object is a star or media work, the video is the latest video data related to the list object. The information display system may first determine the video of each list object through the list, and then load the video into the real scene shooting image for synchronous playing.

Optionally, the play order of videos may be based on the release time of the videos, for example, video data whose release time is close to the current time is preferentially loaded into the real scene shooting image; and the play order may also be implemented based on the list rankings of the list objects in the list, for example, the video data of the list object whose list ranking is higher will be preferentially loaded into the real scene shooting image.

By performing the above-mentioned method, the modeling information of at least one list object in the list, and the comment information and video information related to the list may be loaded into the real scene shooting image, and displayed synchronously, so as to bring the user a better visual experience.

In order to provide the user with better interactivity, in other optional implementations, the list information display method further includes:

step 205: determining a list object selected by the user in the real scene shooting image displayed in response to an interactive operation triggered by the user; and step 206: displaying an interactive result in the real scene shooting image, and the interaction result being generated by performing the interactive operation on the list object selected by the user.

Figure 5:
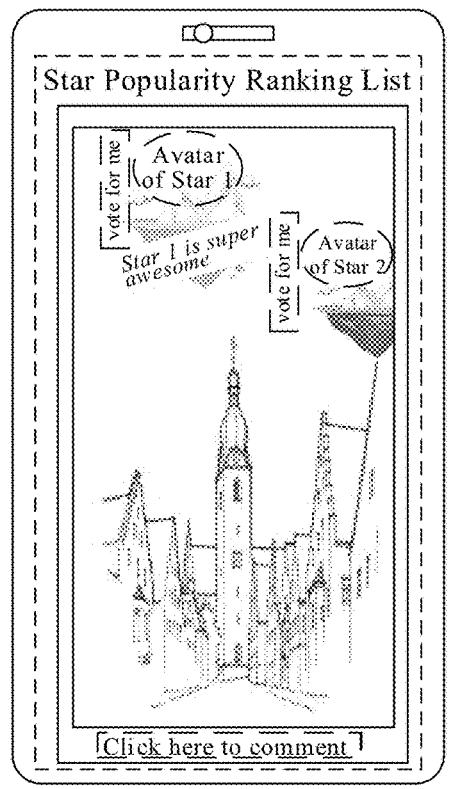
FIG. 5 is a schematic diagram of a second interface of a list information display method provided by the present disclosure.

FIG. 5 is a schematic diagram of a second interface of the list information display method provided by the present disclosure. As illustrated in FIG. 5, in the interface, a plurality of interactive triggering modes are further provided for the user to select and trigger. For example, the interactive operation includes at least one selected from a group consisting of: a boost ranking operation, a comment information interactive operation, and a video playing interactive operation (not illustrated in the figures) performed on the list object selected by the user.

Figure 6:
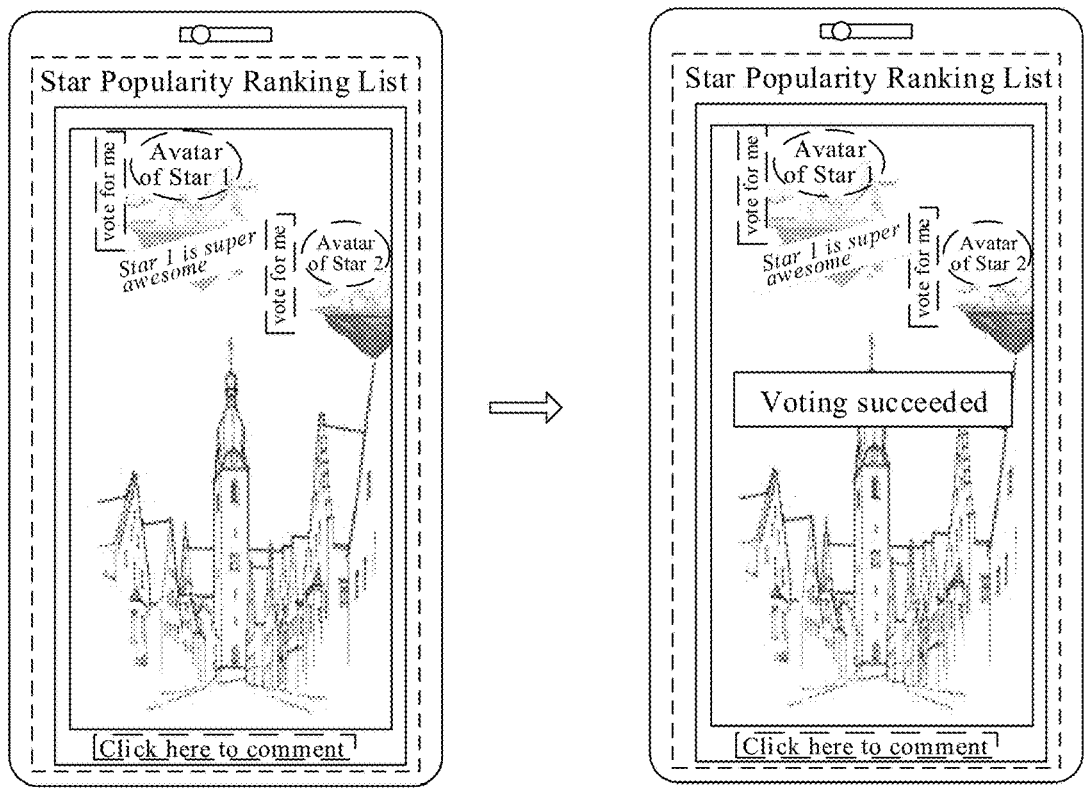
FIG. 6 is a schematic diagram of a third interface of a list information display method provided by the present disclosure.

Specifically, FIG. 6 is a schematic diagram of a third interface of the list information display method provided by the present disclosure. As illustrated in FIG. 6, the user can vote for the favorite star of the use by selecting a boost ranking button as illustrated in FIG. 5, in this case, the terminal generates a boost ranking request and sends it to the server for the server to receive and update the list. Of course, on the interface, the user receives a message prompt such as "boost ranking operation is successful" or the like.

Figure 7:
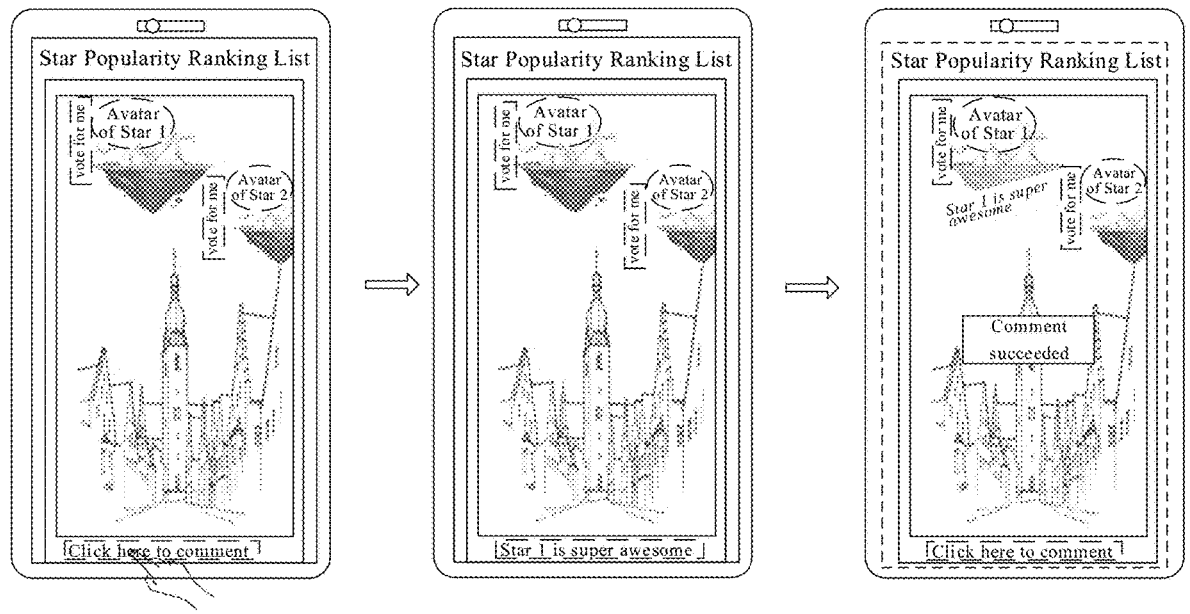
FIG. 7 is a schematic diagram of a fourth interface of a list information display method provided by the present disclosure.

FIG. 7 is a schematic diagram of a fourth interface of the list information display method provided by the present disclosure. The user may further use a comment information sending button illustrated in FIG. 7 to leave a message or comment for a favorite star. In this case, the terminal sends the information input by the user to the server for the server to obtain and cache, and the message will be processed as comment information and displayed on respective terminals in real time for respective users to view. In one embodiment, the foregoing processing and dynamic display methods for text comment may be used to display the comment information input by the user in real time in the terminal.

The user may further control the currently playing video information through video play and switch buttons (not illustrated in the figures). In this case, the terminal sends a control request to the server, and the server feeds back a control result to the terminal for the user to view.

The above-mentioned embodiments can make full use of the virtual enhanced display technology to enhance the visual display effect of the list while providing the user with the display of the list. On the one hand, the user can obtain more information related to the list information while obtaining the list information, which improves the efficiency of information acquisition; and on the other hand, the user can obtain information in the real scene shooting image, which improves the visual effect and interactive experience.

Figure 8:
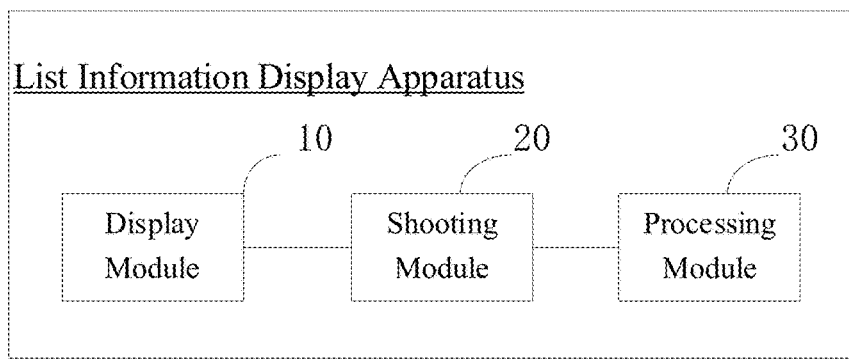
FIG. 8 is a block diagram of a structure of an information display system provided by at least one embodiment of the present disclosure.

Corresponding to the list information display method in the above-mentioned embodiments, FIG. 8 is a block diagram of a structure of a list information display apparatus provided by at least one embodiment of the present disclosure. For convenience of explanation, only parts related to the embodiments of the present disclosure are illustrated. Referring to FIG. 8, the list information display apparatus includes a display module 10, a shooting module 20, and a processing module 30.

The display module 10 is configured to display list information in response to an information display operation triggered by a user.

The shooting module 20 is configured to obtain a real scene shooting image.

The processing module 30 is configured to load a plurality of types of information related to the list information into the real scene shooting image for display by the display module 10.

In an alternative embodiment, the plurality of types of information related to the list information include modeling information of at least one list object in a list, and the plurality of types of information also include comment information and/or video information related to the list.

Correspondingly, the processing module 30 is specifically configured to load the modeling information of the at least one list object in the list into the real scene shooting image, and load the comment information and/or the video information related to the list into the real scene shooting image.

The display module 10 is configured to display the real scene shooting image loaded with the plurality of types of information.

In an alternative embodiment, the processing module 30 is specifically configured to call real-time list data from a server and generate the modeling information of the at least one list object in the list according to the real-time list data.

In an alternative embodiment, the real-time list data includes information of a plurality of list objects and a list ranking of each list object of the plurality of list objects.

Correspondingly, the processing module 30 is specifically configured to determine at least one target list object from the plurality of list objects according to the real-time list data, and the target list object includes a list object whose list ranking is greater than a preset ranking threshold; and the processing module 30 is further configured to generate modeling information of respective target list objects according to list rankings of the respective target list objects, and the modeling information of the respective target list objects constitutes the modeling information of the list.

In an alternative embodiment, the processing module 30 is specifically configured to call a ranking model, that is preset, according to the list rankings of the respective target list objects and generate modeling information of the target list object according to information of the target list object and a ranking model corresponding to the target list object, and different list rankings correspond to different ranking models.

In an alternative embodiment, the processing module 30 is further configured to call real-time comment data from a server, perform a text special effect processing on text content in the real-time comment data to obtain the comment information, and load the comment information obtained after performing the text special effect processing into the real scene shooting image, so that the display module 10 can dynamically display the comment information in the real scene shooting image.

In an alternative embodiment, the real-time comment data further comprises comment time.

The processing module 30 is specifically configured to perform different text special effect processing on the text content in the real-time comment data according to the comment time to obtain the comment information.

In an alternative embodiment, the text special effect processing includes processing the text content in a display dimension, and/or processing the text content in a display form of text.

In an alternative embodiment, the processing module 30 is specifically configured to call video data related to respective list objects in the list from a server, and load the video data sequentially into the real scene shooting image according to release time of respective video data, or list rankings of the respective list objects to which the respective video data is related.

In an alternative embodiment, the processing module 30 is further configured to determine a list object selected by the user in the displayed real scene shooting image in response to an interactive operation triggered by the user, and display an interactive result in the real scene shooting image, and the interaction result is generated by performing the interactive operation on the list object selected by the user.

In an alternative embodiment, the interactive operation includes at least one selected from a group consisting of: a boost ranking operation, a comment information interactive operation, and a video playing interactive operation performed on the list object selected by the user.

In an alternative embodiment, the display module 10 is specifically configured to determine a display transparency of each type of information, and display the plurality of types of information in the real scene shooting image based on the display transparency of each type of information.

The list information display apparatus provided by the embodiments of the present disclosure displays list information in response to an information display operation triggered by a user, obtains a real scene shooting image, and loads a plurality of types of information related to the list information into the real scene shooting image and displays the real scene shooting image loaded with plurality of types of information. Due to the use of virtual enhanced display technology, while the list information is displayed in the real scene shooting image, a plurality of types of information related to the list information are also displayed. On the one hand, the user can obtain more information related to the list information while obtaining the list information, which improves the efficiency of information acquisition; and on the other hand, the user can obtain information in the real scene shooting image, which improves the visual effect and interactive experience.

The electronic device provided by the present embodiment may be used to implement the technical solutions of the above-mentioned method embodiments, the implementation principles and technical effects thereof are similar, and details are not described herein again in the present embodiment.

Figure 9:
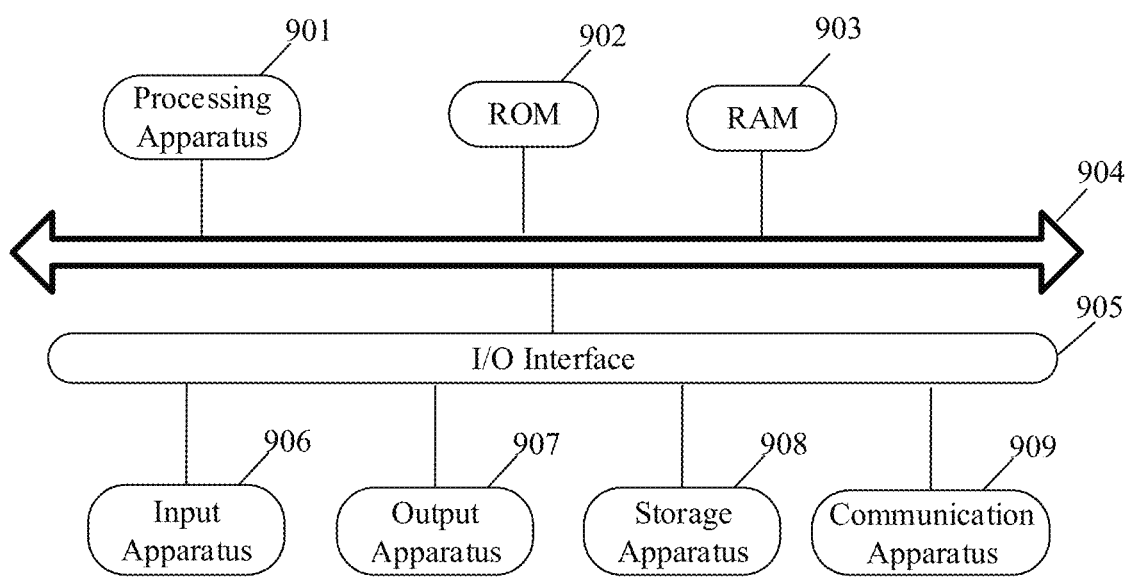
FIG. 9 is a schematic diagram of a hardware structure of an electronic device provided by at least one embodiment of the present disclosure.

Referring to FIG. 9, FIG. 9 illustrates a schematic diagram of a structure of an electronic device 900 suitable for implementing the embodiments of the present disclosure, and the electronic device 900 may be a terminal device or a media library. The terminal device may include, but is not limited to, mobile terminals such as a mobile phone, a notebook computer, a digital broadcasting receiver, a personal digital assistant (PDA), a portable Android device (PAD), a portable media player (PMP), a vehicle-mounted terminal (e.g., a vehicle-mounted navigation terminal), or the like, and fixed terminals such as a digital TV, a desktop computer, or the like. The electronic device illustrated in FIG. 9 is merely an example, and should not impose any limitation to the functions and the scope of use of the embodiments of the present disclosure.

As illustrated in FIG. 9, the electronic device 900 may include a processing apparatus 901 (e.g., a central processing unit, a graphics processing unit, etc.), which can perform various suitable actions and processing according to a program stored in a read only memory (ROM) 902 or a program loaded from a storage apparatus 908 into a random access memory (RAM) 903. The RAM 903 further stores various programs and data required for operations of the electronic device 900. The processing apparatus 901, the ROM 902, and the RAM 903 are connected to each other through a bus 904. An input/output (I/O) interface 905 is also connected to the bus 904.

Usually, the following apparatus may be connected to the I/O interface 905: an input apparatus 906 including, for example, a touch screen, a touch pad, a keyboard, a mouse, a camera, a microphone, an accelerometer, a gyroscope, or the like; an output apparatus 907 including, for example, a screen, a loudspeaker, a vibrator, or the like; a storage apparatus 908 including, for example, a magnetic tape, a hard disk, or the like; and a communication apparatus 909. The communication apparatus 909 may allow the electronic device 900 to communicate wirelessly or by wire with other devices to exchange data. While FIG. 9 illustrates the electronic device 900 having various apparatuses, it should be understood that not all of the illustrated apparatuses are necessarily implemented or included. More or fewer apparatuses may be implemented or included alternatively.

Particularly, according to the embodiments of the present disclosure, the processes described above with reference to the flowcharts may be implemented as a computer software program. For example, some embodiments of the present disclosure include a computer program product, which includes a computer program carried on a non-transitory computer-readable medium. The computer program includes program codes for executing the methods shown in the flowcharts. In such embodiments, the computer program may be downloaded online through the communication apparatus 909 and installed, or may be installed from the storage apparatus 908, or may be installed from the ROM 902. When the computer program is executed by the processing apparatus 901, the above-mentioned functions defined in the method provided in the embodiments of the present disclosure are performed.

It needs to be noted that the computer readable medium described above in the present disclosure may be a computer readable signal medium or a computer readable storage medium or any combination thereof. For example, the computer readable storage medium may be, but not limited to, an electric, magnetic, optical, electromagnetic, infrared, or semiconductor system, apparatus, or device, or any combination of them. More specific examples of the computer readable storage medium may include, but are not limited to: an electrical connection having one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any appropriate combination of them. In the present disclosure, the computer readable storage medium may be any tangible medium containing or storing a program that can be used by or in combination with an instruction execution system, apparatus, or device. In the present disclosure, the computer readable signal medium may include a data signal that propagates in a baseband or as a part of a carrier and carries computer readable program codes. The data signal propagating in such a manner may take a variety of forms, including but not limited to an electromagnetic signal, an optical signal, or any appropriate combination thereof. The computer readable signal medium may also be any computer readable medium other than the computer readable storage medium. The computer readable signal medium may send, propagate, or transmit a program used by or in combination with an instruction execution system, apparatus, or device. The program code contained on the computer readable medium may be transmitted by using any suitable medium, including but not limited to an electric wire, a fiber-optic cable, radio frequency (RF), and the like, or any appropriate combination of them.

The above-mentioned computer readable medium may be included in the electronic device described above, or may exist alone without being assembled into the electronic device.

The above-mentioned computer readable medium may carry one or more programs, when the one or more programs are executed by the electronic device, the electronic device is caused to perform the method illustrated in the above embodiments.

Computer program codes for performing the operations in the present disclosure may be written in one or more programming languages or a combination thereof. The above-mentioned programming languages include object oriented programming languages, such as Java, Smalltalk, and C++, and also include conventional procedural programming languages, such as "C" language or similar programming languages. The program code can be executed fully on a user's computer, executed partially on a user's computer, executed as an independent software package, executed partially on a user's computer and partially on a remote computer, or executed fully on a remote computer or a media library. In the scenario involving a remote computer, the remote computer may be connected to the user's computer through any type of networks including a local area network (LAN) or a wide area network (WAN), or may be connected to an external computer (e.g., connected through the Internet from an Internet Service Provider).

The flowcharts and block diagrams in the accompanying drawings illustrate system architectures, functions, and operations that may be implemented by the system, method, and computer program products according to the various embodiments of the present disclosure. In this regard, each block in the flowcharts or block diagrams may represent a module, a program segment, or a part of code, and the module, the program segment, or the part of code includes one or more executable instructions for implementing specified logic functions. It should also be noted that, in some alternative implementations, functions marked in the blocks may also occur in an order different from the order designated in the accompanying drawings. For example, two consecutive blocks can actually be executed substantially in parallel, and they may sometimes be executed in a reverse order, which depends on involved functions. It should also be noted that each block in the flowcharts and/or block diagrams and combinations of the blocks in the flowcharts and/or block diagrams may be implemented by a dedicated hardware-based system for executing specified functions or operations, or may be implemented by a combination of a dedicated hardware and computer instructions.

Related units described in the embodiments of the present disclosure may be implemented by software, or may be implemented by hardware. The name of a unit does not constitute a limitation on the unit itself. For example, a first acquisition unit may also be described as "a unit for obtaining at least two Internet protocol addresses".

The functions described above in the present disclosure may be executed at least in part by one or more hardware logic components. For example, without limitations, exemplary types of the hardware logic components that can be used include: a field programmable gate array (FPGA), an application specific integrated circuit (ASIC), an application specific standard product (ASSP), a system on chip (SOC), a complex programmable logic device (CPLD), and the like.

In the context of the present disclosure, a machine readable medium may be a tangible medium that may contain or store a program for use by or in combination with an instruction execution system, apparatus, or device. The machine readable medium may be a machine readable signal medium or a machine readable storage medium. The machine readable medium may include but not be limited to an electronic, magnetic, optical, electromagnetic, infrared, or semiconductor system, apparatus, or device, or any appropriate combination of them. More specific examples of the machine readable storage medium may include an electrical connection based on one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any appropriate combination of them.

The following are some embodiments of the present disclosure.

In a first aspect, according to one or more embodiments of the present disclosure, a list information display method is provided and comprises: displaying list information in response to an information display operation triggered by a user; obtaining a real scene shooting image; and loading a plurality of types of information related to the list information into the real scene shooting image and displaying the real scene shooting image.

Optionally, the plurality of types of information related to the list information comprise modeling information of at least one list object in a list, and the plurality of types of information further comprise comment information and/or video information related to the list; correspondingly, the loading the plurality of types of information related to the list information into the real scene shooting image and displaying the real scene shooting image, comprises: loading the modeling information of the at least one list object in the list into the real scene shooting image, and loading the comment information and/or the video information related to the list into the real scene shooting image; and displaying the real scene shooting image loaded with the plurality of types of information.

Optionally, the method further comprises: calling real-time list data from a server; and generating the modeling information of the at least one list object in the list according to the real-time list data.

Optionally, the real-time list data comprises information of a plurality of list objects and a list ranking of each list object of the plurality of list objects; correspondingly, the generating the modeling information of the at least one list object in the list according to the real-time list data, comprises: determining at least one target list object from the plurality of list objects according to the real-time list data, where the target list object comprises a list object whose list ranking is greater than a preset ranking threshold; and generating modeling information of each target list object according to the list ranking of each target list object, where the modeling information of each target list object constitutes modeling information of the list.

Optionally, the generating the modeling information of each target list object according to the list ranking of each target list object, comprises: calling a ranking model, that is preset, according to the list ranking of each target list object; and generating modeling information of a target list object according to information of the target list object and a ranking model corresponding to the target list object, where different list rankings correspond to different ranking models.

Optionally, the loading the comment information related to the list into the real scene shooting image, comprises: calling real-time comment data from a server; performing a text special effect processing on text content in the real-time comment data to obtain the comment information; and loading the comment information obtained after performing the text special effect processing into the real scene shooting image and dynamically displaying the comment information in the real scene shooting image.

Optionally, the real-time comment data further comprises comment time; and the performing the text special effect processing on the text content in the real-time comment data to obtain the comment information, comprises: performing different text special effect processing on the text content in the real-time comment data according to the comment time to obtain the comment information.

Optionally, the text special effect processing comprises processing the text content in a display dimension, and/or processing the text content in a display form of text.

Optionally, the loading the video information related to the list into the real scene shooting image, comprises: calling video data related to respective list objects in the list from a server; and loading the video data sequentially into the real scene shooting image according to release time of the video data, or list rankings of the respective list objects to which the video data is related.

Optionally, the list information display method further comprises: determining a list object selected by the user in the real scene shooting image displayed in response to an interactive operation triggered by the user; and displaying an interactive result in the real scene shooting image, and the interaction result being generated by performing the interactive operation on the list object selected by the user.

Optionally, the interactive operation comprises at least one selected from a group consisting of: a boost ranking operation, a comment information interactive operation, and a video playing interactive operation performed on the list object selected by the user.

Optionally, the loading the plurality of types of information related to the list information into the real scene shooting image and displaying the real scene shooting image, comprises: determining a display transparency of each type of information; and displaying the plurality of types of information in the real scene shooting image based on the display transparency of each type of information.

In a second aspect, according to one or more embodiments of the present disclosure, a list information display apparatus is provided and comprises: a display module, configured to display list information in response to an information display operation triggered by a user; a shooting module, configured to obtain a real scene shooting image; and a processing module, configured to load a plurality of types of information related to the list information into the real scene shooting image for display by the display module.

In an alternative embodiment, the plurality of types of information related to the list information comprise modeling information of at least one list object in a list, and the plurality of types of information further comprise comment information and/or video information related to the list; correspondingly, the processing module is specifically configured to load the modeling information of the at least one list object in the list into the real scene shooting image, and load the comment information and/or the video information related to the list into the real scene shooting image.

The display module is configured to display the real scene shooting image loaded with the plurality of types of information.

In an alternative embodiment, the processing module is specifically configured to call real-time list data from a server and generate the modeling information of the at least one list object in the list according to the real-time list data.

In an alternative embodiment, the real-time list data includes information of a plurality of list objects and a list ranking of each list object of the plurality of list objects.

Correspondingly, the processing module is specifically configured to determine at least one target list object from the plurality of list objects according to the real-time list data, and the target list object includes a list object whose list ranking is greater than a preset ranking threshold; and the processing module is further configured to generate modeling information of respective target list objects according to list rankings of the respective target list objects, and the modeling information of the respective target list objects constitutes the modeling information of the list.

In an alternative embodiment, the processing module is specifically configured to call a ranking model, that is preset, according to the list rankings of the respective target list objects and generate modeling information of the target list object according to information of the target list object and a ranking model corresponding to the target list object, and different list rankings correspond to different ranking models.

In an alternative embodiment, the processing module is further configured to call real-time comment data from a server, perform a text special effect processing on text content in the real-time comment data to obtain the comment information, and load the comment information obtained after performing the text special effect processing into the real scene shooting image, so that the display module dynamically displays the comment information in the real scene shooting image.

In an alternative embodiment, the real-time comment data further comprises comment time.

The processing module is specifically configured to perform different text special effect processing on the text content in the real-time comment data according to the comment time to obtain the comment information.

In an alternative embodiment, the text special effect processing includes processing the text content in a display dimension, and/or processing the text content in a display form of text.

In an alternative embodiment, the processing module is specifically configured to call video data related to respective list objects in the list from a server, and load the video data sequentially into the real scene shooting image according to release time of respective video data, or list rankings of the respective list objects to which the respective video data is related.

In an alternative embodiment, the processing module is further configured to determine a list object selected by the user in the displayed real scene shooting image in response to an interactive operation triggered by the user, and display an interactive result in the real scene shooting image, and the interaction result is generated by performing the interactive operation on the list object selected by the user.

In an alternative embodiment, the interactive operation includes at least one selected from a group consisting of: a boost ranking operation, a comment information interactive operation, and a video playing interactive operation performed on the list object selected by the user.

In an alternative embodiment, the display module is specifically configured to determine a display transparency of each type of information, and display the plurality of types of information in the real scene shooting image based on the display transparency of each type of information.

In a third aspect, according to one or more embodiments of the present disclosure, an electronic device comprises: at least one processor and a memory, the memory stores computer-executable instructions; and the at least one processor executes the computer-executable instructions stored in the memory to cause the at least one processor to execute the list information display method as described in any one of the above embodiments.

In a fourth aspect, according to one or more embodiments of the present disclosure, a computer-readable storage medium is provided, computer-executable instructions are stored in the computer-readable storage medium, and when a processor executes the computer-executable instructions, the list information display method as described in any one of the above embodiments is implemented.

The foregoing descriptions are merely the illustrations of the alternative embodiments of the present disclosure and the explanations of the technical principles involved. Those skilled in the art should understand that the scope of the disclosure involved in the present disclosure is not limited to the technical solutions formed by a specific combination of the technical features described above, and shall also cover other technical solutions formed by any combination of the technical features described above or equivalent features thereof without departing from the concept of the present disclosure. For example, the technical features described above may be mutually replaced with the technical features having similar functions disclosed herein (but not limited thereto) to form new technical solutions.

In addition, while operations have been described in a particular order, it shall not be construed as requiring that such operations are performed in the stated particular order or in a sequential order. Under certain circumstances, multitasking and parallel processing may be advantageous. Similarly, while some specific implementation details are included in the above discussions, these shall not be construed as limitations to the scope of the present disclosure. Some features described in the context of a separate embodiment may also be combined in a single embodiment. Conversely, various features described in the context of a single embodiment may also be implemented in various embodiments individually or in a plurality of embodiments in any appropriate sub-combination.

Although the present subject matter has been described in a language specific to structural features and/or logical method acts, it will be appreciated that the subject matter defined in the appended claims is not necessarily limited to the particular features or acts described above. Rather, the particular features and acts described above are merely exemplary forms for implementing the claims.

What is claimed is:

1. A list information display method, comprising:
   displaying list information in response to an information display operation triggered by a user;
   obtaining a real scene shooting image; and
   loading a plurality of types of information related to the list information into the real scene shooting image and displaying the real scene shooting image loaded with the plurality of types of information;
   wherein the loading the plurality of types of information related to the list information into the real scene shooting image and displaying the real scene shooting image loaded with the plurality of types of information, comprises:
   determining a display transparency of the plurality of types of information; and
   displaying the plurality of types of information in the real scene shooting image based on the display transparency of the plurality of types of information.

2. The list information display method according to claim 1, wherein the plurality of types of information related to the list information comprise modeling information of at least one list object in a list, and the plurality of types of information further comprise comment information and/or video information related to the list;
   the loading the plurality of types of information related to the list information into the real scene shooting image and displaying the real scene shooting image loaded with the plurality of types of information, comprises:
   loading the modeling information of the at least one list object in the list into the real scene shooting image, and loading the comment information and/or the video information related to the list into the real scene shooting image; and
   displaying the real scene shooting image loaded with the plurality of types of information.

3. The list information display method according to claim 2, further comprising:
   calling real-time list data from a server; and
   generating the modeling information of the at least one list object in the list according to the real-time list data.

4. The list information display method according to claim 2, wherein the loading the comment information related to the list into the real scene shooting image, comprises:
   calling real-time comment data from a server;
   performing a text special effect processing on text content in the real-time comment data to obtain the comment information; and
   loading the comment information obtained after performing the text special effect processing into the real scene shooting image and dynamically displaying the comment information in the real scene shooting image.

5. The list information display method according to claim 4, wherein the real-time comment data further comprises comment time; and
   the performing the text special effect processing on the text content in the real-time comment data to obtain the comment information, comprises:
   performing different text special effect processing on the text content in the real-time comment data according to the comment time to obtain the comment information.

6. The list information display method according to claim 5, wherein the text special effect processing comprises processing the text content in a display dimension, and/or processing the text content in a display form of text.

7. The list information display method according to claim 2, wherein the loading the video information related to the list into the real scene shooting image, comprises:
   calling video data related to respective list objects in the list from a server; and
   loading the video data sequentially into the real scene shooting image according to release time of the video data, or list rankings of the respective list objects to which the video data is related.

8. The list information display method according to claim 2, further comprising:
   determining a list object selected by the user in the real scene shooting image displayed in response to an interactive operation triggered by the user; and
   displaying an interactive result in the real scene shooting image, and the interactive result being generated by performing the interactive operation on the list object selected by the user.

9. The list information display method according to claim 8, wherein the interactive operation comprises at least one selected from a group consisting of: a boost ranking operation, a comment information interactive operation, and a video playing interactive operation performed on the list object selected by the user.

10. The list information display method according to claim 3, wherein the real-time list data comprises information of a plurality of list objects and a list ranking of each list object of the plurality of list objects;
    the generating the modeling information of the at least one list object in the list according to the real-time list data, comprises:
    determining at least one target list object from the plurality of list objects according to the real-time list data, wherein the at least one target list object comprises a list object whose list ranking is greater than a preset ranking threshold; and
    generating modeling information of each target list object according to the list ranking of each target list object, wherein the modeling information of each target list object constitutes modeling information of the list.

11. The list information display method according to claim 3, wherein the loading the comment information related to the list into the real scene shooting image, comprises:
    calling real-time comment data from a server;

performing a text special effect processing on text content in the real-time comment data to obtain the comment information; and loading the comment information obtained after performing the text special effect processing into the real scene shooting image and dynamically displaying the comment information in the real scene shooting image.

12. The list information display method according to claim 3, wherein the loading the video information related to the list into the real scene shooting image, comprises:

calling video data related to respective list objects in the list from a server; and loading the video data sequentially into the real scene shooting image according to release time of the video data, or list rankings of the respective list objects to which the video data is related.

13. The list information display method according to claim 10, wherein the generating the modeling information of each target list object according to the list ranking of each target list object, comprises:

calling a ranking model, that is preset, according to the list ranking of each target list object; and generating modeling information of a target list object according to information of the target list object and a ranking model corresponding to the target list object, wherein different list rankings correspond to different ranking models.

14. The list information display method according to claim 13, wherein the loading the comment information related to the list into the real scene shooting image, comprises:

calling real-time comment data from a server;

performing a text special effect processing on text content in the real-time comment data to obtain the comment information; and loading the comment information obtained after performing the text special effect processing into the real scene shooting image and dynamically displaying the comment information in the real scene shooting image.

15. The list information display method according to claim 13, wherein the loading the video information related to the list into the real scene shooting image, comprises:

calling video data related to respective list objects in the list from a server; and loading the video data sequentially into the real scene shooting image according to release time of the video data, or list rankings of the respective list objects to which the video data is related.

16. The list information display method according to claim 13, further comprising:

determining a list object selected by the user in the real scene shooting image displayed in response to an interactive operation triggered by the user; and displaying an interactive result in the real scene shooting image, and the interactive result being generated by performing the interactive operation on the list object selected by the user.

17. An electronic device, comprising:

at least one processor; and a memory, wherein the memory stores computer-executable instructions; and the at least one processor executes the computer-executable instructions stored in the memory to cause the at least one processor to execute the list information display method according to claim 1.

18. A list information display apparatus, comprising:

a display module, configured to display list information in response to an information display operation triggered by a user;

a shooting module, configured to obtain a real scene shooting image; and a processing module, configured to load a plurality of types of information related to the list information into the real scene shooting image for display by the display module;

wherein the display module is further configured to determine a display transparency of the plurality of types of information, and display the plurality of types of information in the real scene shooting image based on the display transparency of the plurality of types of information.

19. A non-transitory computer-readable storage medium, wherein computer-executable instructions are stored in the non-transitory computer-readable storage medium, and when a processor executes the computer-executable instructions, a list information display method is implemented, the list information display method comprises:

displaying list information in response to an information display operation triggered by a user;

obtaining a real scene shooting image; and loading a plurality of types of information related to the list information into the real scene shooting image and displaying the real scene shooting image loaded with the plurality of types of information;

wherein the loading the plurality of types of information related to the list information into the real scene shooting image and displaying the real scene shooting image loaded with the plurality of types of information, comprises:

determining a display transparency of the plurality of types of information; and displaying the plurality of types of information in the real scene shooting image based on the display transparency of the plurality of types of information.

* * * * *